(12) United States Patent
Colaiuta (10) Patent No.: US 6,983,451 B2
(45) Date of Patent: Jan. 3, 2006

(54) METHOD OF TESTING A COMPUTER PROGRAM TRANSLATED INTO A NATIONAL LANGUAGE

(75) Inventor: Nazzareno Massimo Colaiuta, Rome (IT)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 09/848,169

(22) Filed: May 3, 2001

(65) Prior Publication Data

US 2004/0205721 A1 Oct. 14, 2004

(30) Foreign Application Priority Data

Jan. 11, 2001 (GB) .............................. 0100676

(51) Int. Cl.
*G06F 9/44* (2006.01)

(52) U.S. Cl. ............................ 717/125; 717/136; 704/7; 704/8

(58) Field of Classification Search ................. 717/124, 717/125, 136, 137, 174, 175, 127; 704/1–10; 345/700, 703, 735, 744, 746–748
See application file for complete search history.

(56) References Cited

U.S. PATENT DOCUMENTS

| | | | | |
|---|---|---|---|---|
| 5,251,130 A | * | 10/1993 | Andrews et al. ................ | 704/3 |
| 5,664,206 A | * | 9/1997 | Murow et al. .................. | 704/8 |
| 5,678,039 A | * | 10/1997 | Hinks et al. .................... | 707/4 |
| 5,903,859 A | * | 5/1999 | Stone et al. ..................... | 704/8 |
| 6,067,639 A | * | 5/2000 | Rodrigues et al. ............. | 714/38 |
| 6,185,729 B1 | * | 2/2001 | Watanabe et al. ........... | 717/100 |
| 6,275,790 B1 | * | 8/2001 | Yamamoto et al. ............ | 704/8 |
| 6,453,462 B1 | * | 9/2002 | Meade et al. ................ | 717/124 |
| 6,601,018 B1 | * | 7/2003 | Logan ......................... | 702/186 |

OTHER PUBLICATIONS

Jose M. Ladero, "Automating Localization Testing", StickyMinds.com, [http://www.stickyminds.com/pop_print.asp?ObjectID=6281&ObjectType=ART], Accessed Jun. 8, 2004.*

Pancrazio de Mauro, "Internationalizing Messages in Linux Programs", 1999, Linux Journal, vol. 1999, Issue 59es, Article No. 4, ISSN 1075–3583.*

Minnesota Department of Public Safety, "Testing PCs for year 2000 compliance", archived 1998, [http://web.archive.org/web/19981202112831/http://www.dps.state.mn.us/otss/year2000/Testing.htm], accessed Jun. 7, 2004.*

Darkangel, "Norton Ghost", archived Nov. 2000, [http://web.archive.org/web/20001114232300/http://www.net-knowledgebase.com/tutorials/ghost.html], Accessed Jun. 8, 2004.*

* cited by examiner

*Primary Examiner*—Wei Y. Zhen
*Assistant Examiner*—J. Derek Rutten
(74) *Attorney, Agent, or Firm*—Duke W. Yee; Jeffrey S. LaBaw (57) ABSTRACT

A method (400) of testing a computer program translated into a national language comprising the steps of making (435–442) a package in a first location, the package including the translated program, an operating environment for the translated program, a sample of input data for the translated program, a set of translated scripts defining test commands for showing user-visible text messages of the translated program, and a play module for automatically executing the test commands, sending (445) the package to a tester at a second location remote from the first location, operating (455–460) a testing computer at the second location with the package, and running (465–490) the translated program on the testing computer using the test commands.

12 Claims, 5 Drawing Sheets

METHOD OF TESTING A COMPUTER PROGRAM TRANSLATED INTO A NATIONAL LANGUAGE

CROSS-REFERENCES TO RELATED APPLICATIONS

This application is based upon and claims the benefit of priority from application 0100676.6 filed 11 Jan. 2001 in the United Kingdom.

FIELD OF INVENTION

The present invention relates to a method of testing a computer program translated into a national language.

BACKGROUND OF THE INVENTION

A computer program generally interacts with a user showing several user-visible text messages, such as menus, help panels, and the like. Most programs are originally developed in the English language. When the program must be distributed to countries in which the English is not the national language, it is a common practice to translate all text messages into the national language of the country.

The translated program must be tested in order to ensure that the text messages are correctly translated for the context in which they appear; moreover, it is necessary to ensure that the appearance of the translated text messages is correct, for example that the translated text messages within lists and push buttons have an appropriate size. The test (known as Translation Verification Test, or TVT) is commonly carried out by translators who are native of the country in which the program must be distributed.

The testers usually do not have technical expertise. As a consequence, the testers are required to move to a software development laboratory, wherein hardware, software and product experts are available; these technical experts help the testers to set up a testing environment, and to install, configure and drive the translated program in order to show to the testers all the translated text messages.

This implies a large waste of time for moving the testers to the development laboratory; moreover, the moving of each tester involves high costs, such as for the travelling and the stay. All of the above greatly limits the use of the test process and prevents it from being used extensively, with a consequent reduction in the level of quality and reliability of the software production.

It is an object of the present invention to overcome the above mentioned drawbacks. In order to achieve this object, a method of testing a computer program translated into a national language as set out in the first claim is proposed.

DISCLOSURE OF THE INVENTION

Briefly, the present invention provides a method of testing a computer program translated into a national language comprising the steps of making a package in a first location, the package including the translated program, an operating environment for the translated program, a sample of input data for the translated program, a set of translated scripts defining test commands for showing user-visible text messages of the translated program, and a play module for automatically executing the test commands, sending the package to a tester at a second location remote from the first location, operating a testing computer at the second location with the package, and running the translated program on the testing computer using the test commands.

Moreover, the present invention also provides a corresponding system for testing a computer program translated into a national language, a package for use in this system, and a computer readable medium of a removable type storing the package.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
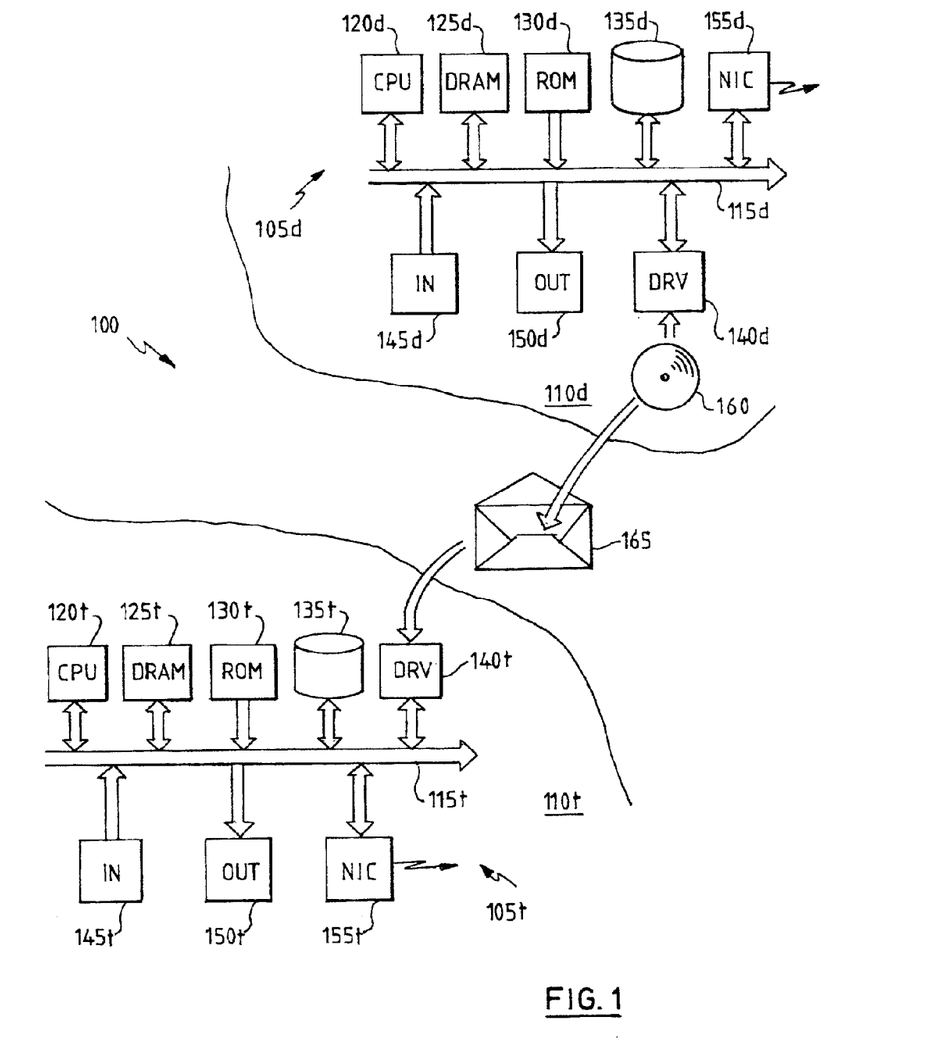
FIG. 1 is a basic block diagram of a system in which the method of the invention can be used.

With reference in particular to FIG. 1, there is shown a system 100 comprising a computer 105d, for example a PC (Personal Computer), which is installed at a software development laboratory 110d. The development computer 105d has several units, which are connected in parallel to a communication bus 115d. In particular, a central processing unit (CPU) 120d controls operation of the development computer 105d, a working memory 125d (typically a DRAM) is used directly by the CPU 120d, and a read-only memory (ROM) 130d stores a basic program for starting the development computer 105d. Various peripheral units are further connected to the bus 115d (by means of respective interfaces). Particularly, a bulk memory consists of a hard-disk 135d and of a driver unit (DRV) 140d for reading/writing CD-ROMs; the development computer 105d further includes an input unit (IN) 145d, which consists for example of a keyboard and a mouse, an output unit (OUT) 150d, which consists for example of a monitor and a printer, and a network interface card (NIC) 155d.

A CD-ROM 160 is inserted into the driver unit 140d and it is burnt; the CD-ROM 160 is then sent by an air-mail service 165 to a further computer 105t installed at a testing location 110t, which is remote from the development laboratory 105d (typically in a different country). The testing computer 105t is similar to the development computer 105d. Particularly, the testing computer 105t includes a communication bus 115t, a central processing unit (CPU) 120t, a working memory (DRAM) 125t, a read-only memory (ROM) 130t, a hard-disk 135t, a driver unit (DRV) 140t, an input unit (IN) 145t, an output unit (OUT) 150t, and a network interface card (NIC) 155t. The computers 105d and 105t consist of units of the same type (for example keyboards with the same national configuration), even if some minor differences are possible (such as in the capacity of the hard-disks).

Similar considerations apply if the computers include different units (for example a driver unit for floppy-disks or a scanner), if the computers have a different structure (such as with a multi-processor architecture), if the development computer and the testing computer are different (but preferably of a compatible type, so that any software can run substantially in the same manner on both computers), if the CD-ROM is sent to the testing location by express courier (or any other delivery service), and the like.

Computer programs are developed by software engineers at the laboratory 110d. The programs are generally written in an object-oriented language and they have a Graphical User Interface (GUI), which allows a user to control the program by using stylised screen objects, such as windows, dialog boxes, pop-up or pull-down menus, text panels, and push or radio buttons. The user interacts with the program by generating a sequence of mouse and keyboard events, to which the program must respond.

Figure 2:
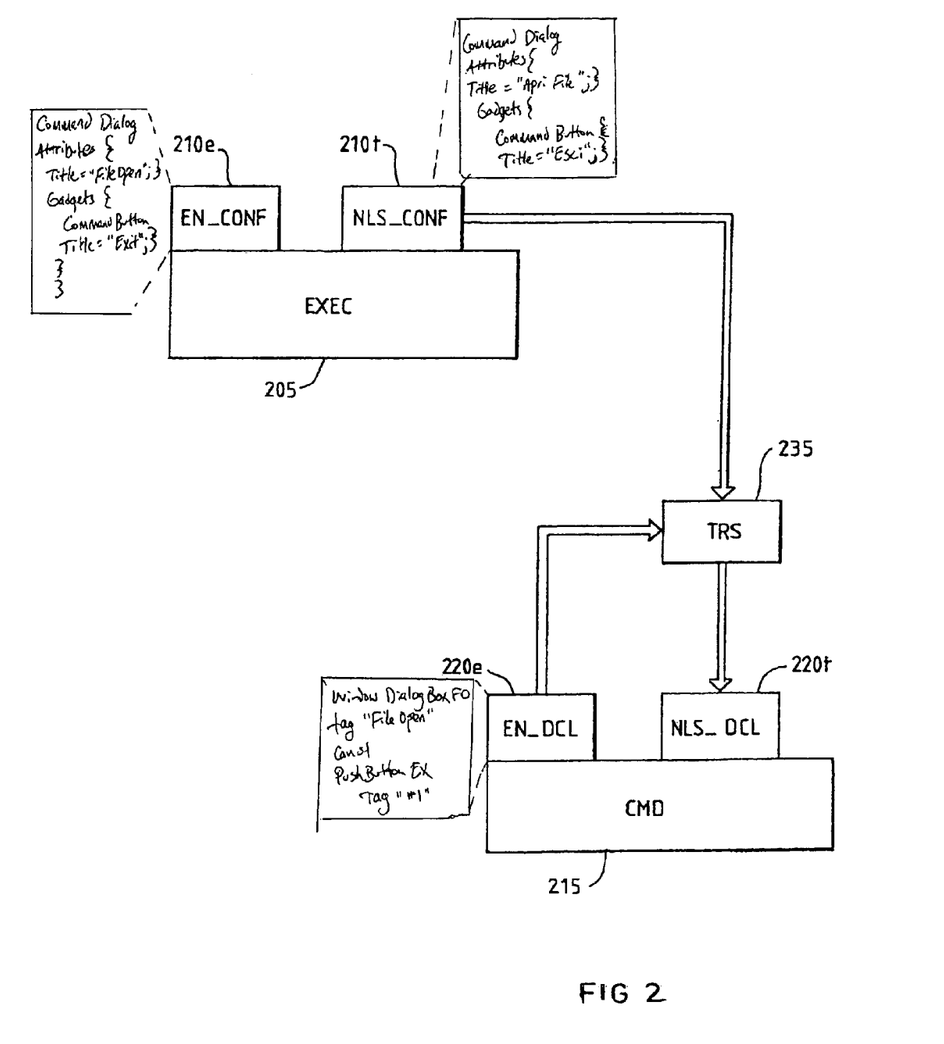
FIG. 2 shows a structure under test.

As shown in FIG. 2, a program originally developed at the laboratory consists of a functional module (EXEC) 205 and a configuration module (EN_CONF) 210e. The functional module 205 embodies the definition (data structures and methods) of each class of objects used by the original program, and the procedures for generating instances of said objects and calling the respective methods in response to events generated by the user. The configuration module 210e contains a set of dialog descriptors, each one consisting of a file that describes dialog (window or dialog box) contents. Particularly, the dialog descriptor includes dialog attributes (for example, a dialog's title as shown in a dialog's title bar) and a list of GUI-objects presented by the dialog and the relevant attributes (for example, a pushbutton and a pushbutton caption as visible in the Graphical User Interface). All user-visible text messages associated with each dialog and with each contained GUI-object are written in an original language, typically English.

A set of test scripts is used to verify the appearance of the text messages of the original program 205,210e. The test scripts consist of a command module (CMD) 215 and a declaration module (EN_DCL) 220e. The command module 215 embodies a test case defined by a sequence of commands (written in a scripting language by a script writer), which simulate user actions, such as pushing of a button or typing a key; each GUI-object is referenced in the test commands by a symbolic identifier. The declaration module 220e consists of a file containing records that map the symbolic identifiers with the respective GUI-object's actual identifiers. For windows and dialog boxes, the actual identifier is the title (caption) as it appears to the user, whereas the contained GUI-objects (such as, push buttons and text fields) are identified by an index (i.e., the order of the GUI-object in relation to its sibling objects). Ultimately, the declaration module 220e contains data structures similar to the ones that are contained in the configuration module 210e. Each window and dialog box, which is described in the declaration module 220e, contains a field pointing to the file name containing the relevant dialog descriptor (configuration module 210e).

The original program 205,210e is translated into one or more languages different from English, in order to localise the program for use in foreign countries. Each translated program, also known as a National Language Support (NLS) version of the program, consists of the same functional module 205 of the original program, which is associated with a configuration module (NLS_CONF) 210t; the configuration module 210t embodies all the dialog descriptors in the corresponding national language (such as Italian).

The (translated) configuration module 210t and the (original) declaration module 220e are provided to a translation module (TRS) 235, which generates a translated declaration module 220t; the translated declaration module 220t is similar to the original declaration module 220e, with the (dialog) actual identifiers translated into Italian. Particularly, the translation module 235 parses the original declaration module 220e. Each time the translation module 235 identifies a statement declaring a window or a dialog box, the same data structure is created into the translated declaration module 220t; the translated actual identifier (caption) is extracted from the translated configuration module 210t, and it is inserted into the corresponding field of the translated declaration module 220t.

For example, a dialog box named "File Open" and containing a push button named "Exit" is defined in the (original) configuration module 210e as follows:

```
Command Dialog {
    Attributes {
        Title = "File Open"; }
    Gadgets {
        CommandButton {
            Title = "Exit"; }
    }
}
```

The original declaration module 220e for the same GUI-object contains the following statements:

```
Window DialogBox FO
    tag "File Open"
    const
    PushButton EX
        Tag "#1"
```

The command in the module 215, which simulates the user action of clicking the mouse on the "Exit" button, is:

FO.EX.Click( )

wherein the symbolic identifiers FO is associated with the actual identifier "File Open" and the symbolic identifier EX is associated with the first PushButton within the dialog box.

The translated configuration module 210t of the Italian version of the program is obtained from the original configuration module 210e by replacing the (English) names "File Open","Exit" with the corresponding (Italian) names "Apri File","Esci":

```
Command Dialog {
    Attributes {
        Title = "Apri File"; }
    Gadgets {
        CommandButton {
            Title = "Esci"; }
    }
}
```

The translated declaration module 220t is then obtained from the original declaration module 220e by replacing the name "File Open" with the corresponding name "Apri File", which is extracted from the translated configuration module 210t.

Likewise considerations apply if the programs and the test scripts have a different structure, if the program is written in a conventional language and has a Character User Interface (CUI), if the (original) test scripts are obtained by directly recording a sequence of events generated by the user, if the original program and the translated program are written in different national languages, if a unique configuration module serves both the functional module and the command module (in this way, the translation of the program under test has no impact on the test scripts), and so on.

Figure 3:
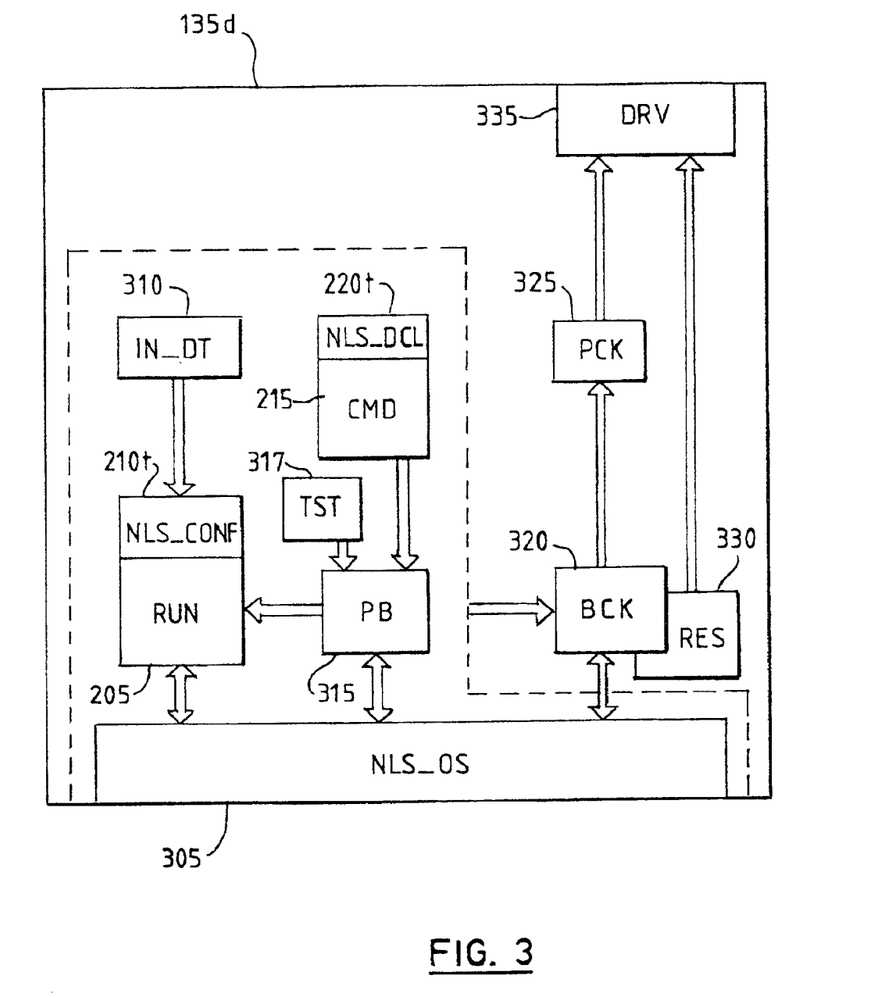
FIG. 3 depicts the content of a hard-disk in a development computer of the system.

Considering now FIG. 3, the hard-disk 135d (of the development computer at the laboratory) stores an operating system (NLS_OS) 305 in the version corresponding to the language of the translated program 205,210t (Italian in the example at issue). The operating system 305 consists of several modules, for example controlling basic functions of the development computer, a network access and an e-mail service, which as a whole define an operating environment for the translated program 205,210t.

The translated program 205,210t is then installed onto the hard-disk 135d, together with the corresponding (translated) test scripts 215,220t. The translated program 205,210t is populated with a sample of input data (IN_DT) 310. A play-back module (PB) 315 is input the command module 215 and the translated declaration module 220t. The play-back module 315 resolves the symbolic identifiers contained in the command module 215, replacing them with the corresponding translated actual identifiers (read from the translated declaration module 220t); the play-back module 315 drives the translated program 205,210t transforming the resolved test commands into GUI-event streams that cause the requested actions to occur. The hard disk also includes a test driver module (TST) 317, which invokes the translated test scripts (to be executed by the play-back module 315) and prompts the tester to verify the relevant text messages, which are subject to the test process.

The hard-disk 135d further includes a back-up module 320. The back-up module 320 takes a snap-shot of the hard-disk 135d and generates a package 325, which consists of a file containing the operating system 305, the translated program 205,210t, the translated test scripts 215,220t, the input data 310, the play-back module 315, and the test driver module 317 in a compressed form. The package 325 and a module 330 for restoring the package 325 are provided to a driver module (DRV) 335, which physically controls the burning of the CD-ROM.

Similar considerations apply if the programs and the data are organised in a different manner, if other functions are provided, if the package has a different structure, and the like.

Figure 4A:
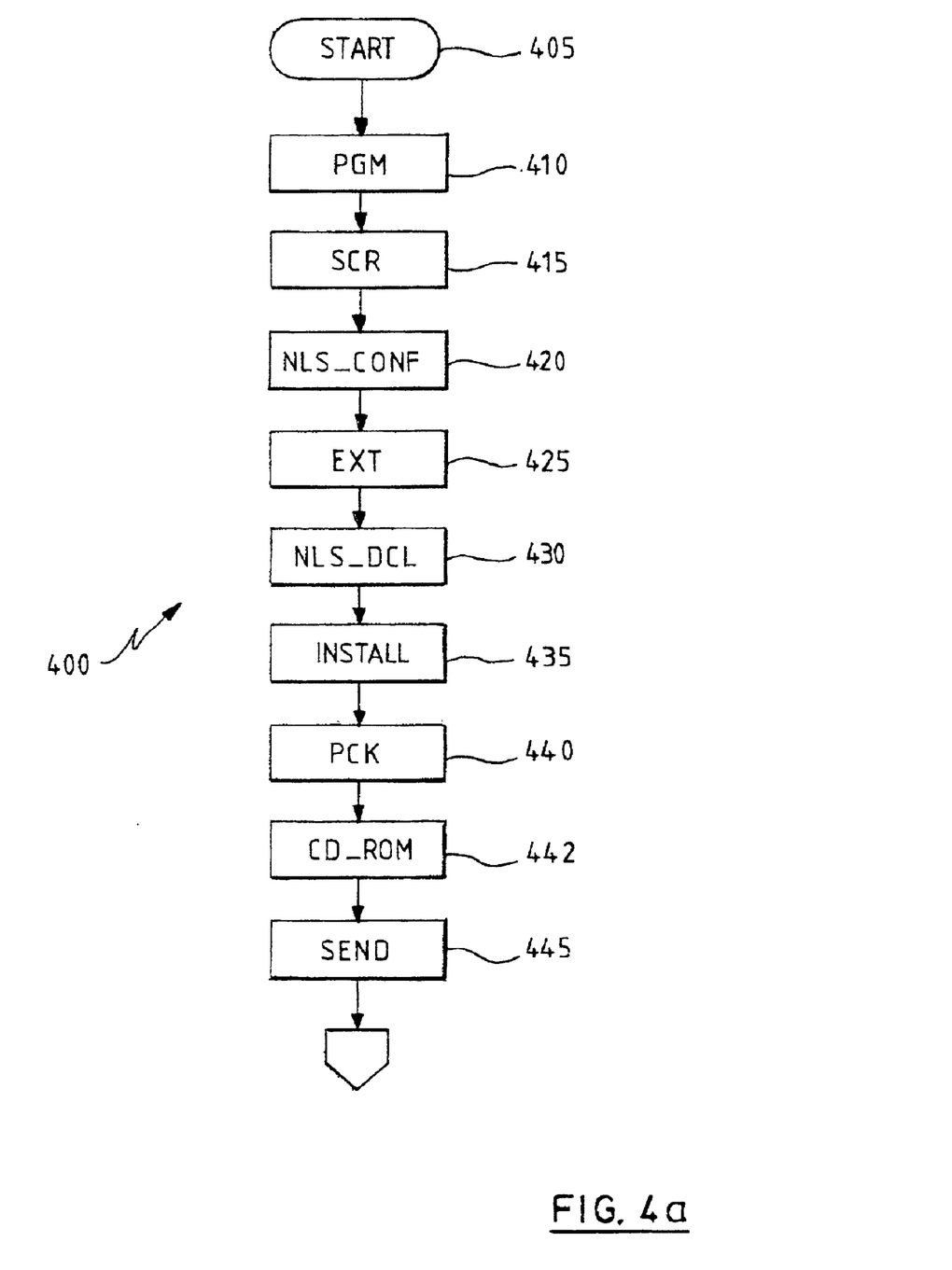
FIGS. 4a–4b are a flow chart of a method used for testing the translated program.
Figure 4B:
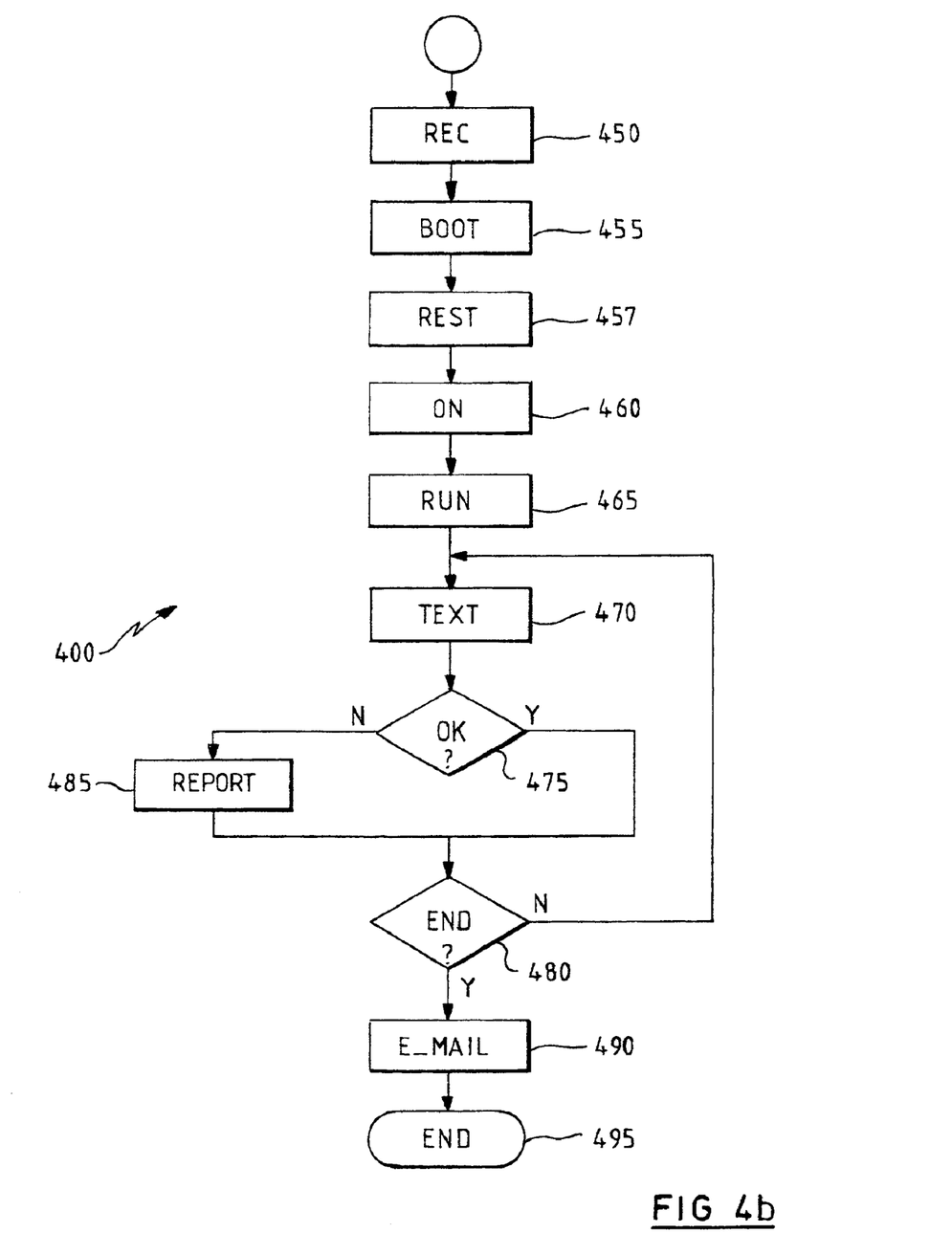

With reference now to FIGS. 4a–4b, when a new program must be shipped, a series of routines, which together make up a method 400, are performed at successive stages in time. The method starts at block 405 and then goes to block 410, wherein the original program is developed at the laboratory (with the text messages in the original configuration module written in English). Proceeding to block 415, the original test scripts (for verifying the translation and appearance of the text messages) are generated. The translated program is obtained from the original program at block 420 by translating all text messages (in the configuration module) into Italian. The method continues to block 425, wherein the translated (dialog) actual identifiers are extracted from the translated configuration module, and then passes to block 430, wherein the translated actual identifiers are inserted into the respective fields of the translated declaration module. Descending into block 435, the operating system, the translated program, the translated test scripts, the input data, the play-back module, the test driver module, and the back-up module are installed onto the hard-disk of the development computer. The back-up module takes a snap-shot of the hard-disk at block 440, and generates the package containing the operating system, the translated program, the translated test scripts, the input data, the play-back module, and the test driver module in a compressed form. Going now to block 442, the package and the restoring module are recorded onto a CD-ROM. The CD-ROM is sent to the testing location by the air-mail service at block 445.

Considering now block 450, the CD-ROM is received at the testing location (in Italy in the example at issue) by a tester, which speaks Italian as his mother tongue. The tester inserts the CD-ROM in the driver unit of the testing computer at block 455, and switches on the same; the tester computer is then booted from the CD-ROM, which involves loading the operating system and starting the restoring module stored thereon. As soon as the tester confirms the execution of the restoring module, the method proceeds to block 457, wherein the package is de-compressed and installed onto the hard-disk of the testing computer (completely wiping out any previous data). The testing computer is switched off at block 460; the tester removes the CD-ROM and then restarts the testing computer.

Passing to block 465, the bootstrap of the testing computer (from the hard-disk) involves the automatic execution of the test driver module, which drives the translated program using the translated test scripts executed by the play-back module. The play-back module simulates user actions, which cause a text message to be show to the tester at block 470. The tester is prompted at block 475 to verify whether the meaning of the text message and its appearance are correct. If so, the method continues to block 480 (described in the following). Conversely, if a defect is detected by the tester, the method descends into block 485, wherein a corresponding entry (containing the detected defect along with a name of the test script that revealed the error) is written to a problem reporting file stored on the hard-disk of the testing computer; the method then continues to block 480. In both cases, the method checks at block 480 if the end of the test scripts has been reached. If not, the method returns to block 470. On the contrary, the method descends into block 490, wherein an e-mail with the problem reporting file attached thereto is sent to the development laboratory. The method then ends at the final block 495.

Likewise considerations apply if an equivalent method is carried out, for example with routines for controlling the execution of the test process, for selecting the test commands to be run, for storing a point reached in the test process as a starting point for a next running of the test scripts, for selecting the test scripts to be run or run again a previously executed test script, and the like.

More generally, in the method of testing a computer program translated into a national language according to the present invention, a package including the translated program, an operating environment for the translated program, a sample of input data for the translated program, a set of translated scripts defining test commands for showing user-visible text messages of the translated program, and a play module for automatically executing the test commands is made in a first location.

The package is sent to a tester at a second location remote from the first location; a testing computer at the second location is operated with the package, and the translated program is then run on the testing computer using the test commands.

The solution of the invention removes the need for testers to move to the development laboratory; this allows the costs for the travelling and the stay of the testers to be saved.

Therefore, the test process is more efficient and cost effective; the test process can be used on a large scale, thereby increasing the level of quality and reliability in the software production.

The preferred embodiment of the present invention described above offers further advantages. Particularly, the package obtained taking a snap-shot of the bulk memory of the development computer onto the CD-ROM guarantees that an exact disk image of the development computer, with the translated program already installed, preconfigured and populated with significant data, is used on the testing computer. Moreover, the testing computer is booted from the CD-ROM and the package is then restored onto its hard-disk. Therefore, the same testing environment envisaged at the development laboratory is used by the tester; this result is obtained in a simple manner and without requiring any technical expertise on the part of the tester.

The tester is automatically prompted to verify each text message; the detected defects are recorded onto the problem reporting file, which is then sent to the development laboratory by e-mail. These features ensure that the tester verifies all text messages; moreover, they make it very easy for the tester to report the results of the test to the development laboratory.

Likewise considerations apply if the package is stored onto a floppy-disk (or any other computer readable medium of a removable type), if it is restored onto the hard-disk of the testing computer with a different procedure, if the problem reporting file is sent to the development laboratory in a different manner (for example by a floppy-disk); alternatively, the package is created in a different manner, it is sent to the testing computer by e-mail, it is not restored onto the testing computer, or the tester is not prompted to verify each text message.

The translated test scripts are automatically obtained from the corresponding original test scripts; preferably, the process is carried out replacing the original (dialog) actual identifiers with the corresponding translated actual identifiers in the declaration module. This allows the program to be tested in different languages from a single set of test scripts (with the declaration module in English). Therefore, the creation, maintenance and portability of the test scripts are greatly enhanced.

Similar considerations apply if the programs and the test scripts have a different structure, if the translated test scripts are obtained from the corresponding original test scripts in a different manner, and so on. However, the solution of the present invention leads itself to be implemented even directly writing or recording the test scripts for each translated program.

Naturally, in order to satisfy local and specific requirements, a person skilled in the art may apply to the solution described above many modifications and alterations all of which, however, are included within the scope of protection of the invention as defined by the following claims.

What is claimed is:

1. A method of testing a computer program translated into a national language comprising the steps of:
   making a package in a first location,
   the package including a translated program that is obtained from a translation of an original program, an operating environment for the translated program, a sample of input data for the translated program, a set of translated scripts that includes a translated declaration module defining test commands for showing user-visible text message of the translated program, and a play module for automatically executing the test commands,
   wherein the original program and the translated program respectively generate a plurality of graphical objects each having a respective original identifier and a translated identifier that are associated with symbolic identifiers for identifying the graphical objects in the set of original scripts and in the set of translated scripts, respectively, wherein each graphical object is referenced in the test commands by a corresponding symbolic identifier,
   wherein the translated scripts are obtained from a set of original scripts that includes an original declaration module and that define test commands for showing user-visible text messages of the original program,
   wherein the original declaration module associates a symbolic identifier with a corresponding original identifier and the translated declaration module associates the symbolic identifier with a corresponding translated identifier,
   the step of obtaining the set of translated scripts from the set of original scripts including obtaining the translated declaration module from the original declaration module by replacing each original identifier with the corresponding translated identifier;
   sending the package to a tester at a second location remote from the first location;
   operating a testing computer at the second location with the package; and
   running the translated program on the testing computer using the test commands.

2. The method according to claim 1, wherein the step of making the package includes installing the translated program, the operating environment, the sample of input data, the set of translated scripts and the play module onto a bulk memory of a development computer at the first location, and taking a snap-shot of the bulk memory of the development computer onto a computer readable medium of a removable type.

3. The method according to claim 2, wherein the step of operating the testing computer at the second location with the package includes booting the testing computer from the removable medium, restoring the snap-shot onto a bulk memory of the testing computer, and restarting the testing computer.

4. The method according to claim 1, wherein the step of running the translated program on the testing computer using the test commands includes:
   prompting the tester to verify each text message,
   adding a corresponding error message to a report stored on the testing computer if the text message is not correct, and
   sending the stored report to the first location.

5. The method according to claim 1, wherein the original program and the translated program include an original configuration module and a translated configuration module, respectively, defining the graphical objects associated with each original identifier and translated identifier, respectively, the step of obtaining the translated declaration module from the original declaration module including extracting each translated identifier from the translated configuration module.

6. A system for testing a computer program translated into a national language comprising:
   means for making a package in a first location, the package including a translated program that has a graphical user interface that generates a plurality of graphical objects each having a respective translated identifier, wherein the translated program is obtained by translating an original program that has a graphical user interface that generates a plurality of graphical objects each having a respective original identifier, an operating environment for the translated program, a sample of input data for the translated program, a set of translated scripts including a translated declaration module defining test commands for showing user-visible text messages of the translated program, and a play module of automatically executing the test commands, wherein the set of translated scripts is obtained from a set of original scripts including an original declaration module defining test commands for showing user-visible text messages of the original program by replacing each original identifier of the original declaration module with a corresponding translated identifier, wherein each respective original identifier and the corresponding translated identifier that replaces the original identifier have a common symbolic identifier;

means for sending the package to a tester at a second location remote from the first location; means for operating a testing computer at the second location with the package; and means for running the translated program on the testing computer using the test commands.

7. A computer readable medium of a removable type for use in a system for testing a computer program translated into a national language comprising:

means for making a package in a first location, the package including a translated program that has a graphical user interface that generates a plurality of graphical objects each having a respective translated identifier, wherein the translated program is obtained by translating an original program that has a graphical user interface that generates a plurality of graphical objects each having a respective original identifier, an operating environment for the translated program, a sample of input data for the translated program, a set of translated scripts including a translated declaration module defining test commands for showing user-visible text messages of the translated program, and a play module for automatically executing the test commands, wherein the set of translated scripts is obtained from a set of original scripts including an original declaration module defining test commands for showing user-visible text messages of the original program by replacing each original identifier of the original declaration module with a corresponding translated identifier, wherein each respective original identifier and the corresponding translated identifier that replaces the original identifier have a common symbolic identifier;

means for sending the package to a tester at a second location remote from the first location;

means for operating a testing computer at the second location with the package; and means for running the translated program on the testing computer using the test commands, wherein the removable medium stores the package and a module for installing the package onto a bulk memory of the testing computer.

8. A system for testing a computer program translated into a national language comprising:

a back-up module for making a package in a first location, the package including a translated program, an operating environment of the translated program that has a graphical user interface that generates a plurality of graphical objects each having a respective translated identifier, wherein the translated program is obtained by translating an original program that has a graphical user interface that generates a plurality of graphical objects each having a respective original identifier, a sample of input data for the translated program, a set of translated scripts including a translated declaration module defining test commands for showing user-visible text messages of the translated program, and a play module for automatically executing the test commands, wherein the set of translated scripts is obtained from a set of original scripts including an original declaration module defining test commands for showing user-visible text messages of the original program by replacing each original identifier of the original declaration module with a corresponding translated identifier, wherein each respective original identifier and the corresponding translated identifier that replaces the original identifier have a common symbolic identifier;

a delivery service for sending the package to a tester at a second location remote from the first location;

a restoring module for operating a testing computer at the second location with the package; and a play-back module for running the translated program on the testing computer using the test commands.

9. The system of claim 6, wherein the package is made by installing the translated program, the operating environment, the sample of input data, the stet of translated scripts and the play module onto a bulk memory of a development computer at the first location and taking a snap-shot of the bulk memory of the development computer onto a computer readable medium of a removable type.

10. The system of claim 9, wherein the means for operating the testing computer at the second location includes means for booting the testing computer from the removable medium, restoring the snap-shot onto a bulk memory of the testing computer, and restarting the testing computer.

11. The system of claim 6, wherein the means for running the translated program on the testing computer using the test commands further includes:

means for prompting the tester to verify each text message;

means for adding a corresponding error message to a report stored on the testing computer if the text message is not correct; and means for sending the stored report to the first location.

12. A computer program product on a computer readable medium that facilitates testing of a program translated into a national language, the computer program product comprising:

an original program in an original language that has a graphical user interface that generates a plurality of graphical objects each having a respective original identifier;

a set of original scripts defining test commands for showing user-visible text messages of the original program and including an original declaration module that associates each respective original identifier with a symbolic identifier;

a translated program obtained from a translation of the original program that has a graphical user interface that generates a plurality of objects each having a respective translated identifier associated with a symbolic identifier; and a set of translated scripts defining test commands for showing user-visible text messages of the translated program, wherein the set of translated scripts include a translated declaration module that associates each translated identifier with a symbolic identifier, wherein the translated scripts are obtained from the original scripts by replacing each original identifier of the original declaration module with a corresponding translated identifier, and wherein each respective original identifier and the corresponding translated identifier that replaces the original identifier have a common symbolic identifier.

* * * * *